US012166309B2

(12) United States Patent
Uchiyama et al.

(10) Patent No.: US 12,166,309 B2
(45) Date of Patent: Dec. 10, 2024

(54) CONNECTOR CAPABLE OF PREVENTING DAMAGE TO A SEAL MEMBER

(71) Applicants: SUMITOMO WIRING SYSTEMS, LTD., Mie (JP); NISSAN MOTOR CO., LTD., Kanagawa (JP)

(72) Inventors: Yoshihiro Uchiyama, Mie (JP); Takahiro Yoneda, Kanagawa (JP); Aritsugu Hirose, Kanagawa (JP)

(73) Assignees: SUMITOMO WIRING SYSTEMS, LTD., Mie (JP); NISSAN MOTOR CO., LTD., Kanagawa (JP)

( * ) Notice: Subject to any disclaimer, the term of this patent is extended or adjusted under 35 U.S.C. 154(b) by 358 days.

(21) Appl. No.: 17/772,935

(22) PCT Filed: Oct. 29, 2020

(86) PCT No.: PCT/JP2020/040551
§ 371 (c)(1),
(2) Date: Apr. 28, 2022

(87) PCT Pub. No.: WO2021/100431
PCT Pub. Date: May 27, 2021

(65) Prior Publication Data

US 2022/0407261 A1 Dec. 22, 2022

(30) Foreign Application Priority Data

Nov. 19, 2019 (JP) ................................ 2019-208833

(51) Int. Cl.
*H01R 13/52* (2006.01)
*H01R 13/506* (2006.01)

(52) U.S. Cl.
CPC ....... *H01R 13/5202* (2013.01); *H01R 13/506* (2013.01)

(58) Field of Classification Search
CPC .......................... H01R 13/5202; H01R 13/506
(Continued)

(56) References Cited

U.S. PATENT DOCUMENTS 5,145,410 A 9/1992 Maejima et al.
5,538,441 A 7/1996 Paolucci et al.
(Continued)

FOREIGN PATENT DOCUMENTS

CN 104659554 5/2015
CN 105379026 3/2016
(Continued)

OTHER PUBLICATIONS

International Search Report issued in International Pat. Appl. No. PCT/JP2020/040551, dated Dec. 22, 2020, (with English translation).

(Continued)

*Primary Examiner* — Abdullah A Riyami
*Assistant Examiner* — Amara Anderson
(74) *Attorney, Agent, or Firm* — GREENBLUM & BERNSTEIN, P.L.C.

(57) ABSTRACT

A connector includes a housing having a plurality of cavities, a seal member having a plurality of seal holes, a rear holder that holds the seal member between the housing and the rear holder, and a terminal fitting that is inserted into the cavity through the seal hole. The seal member includes a main body portion disposed on a side of the rear holder, and a plurality of protrusions protruding forward from the main body portion. Each of the seal holes has a shape penetrating in a front-rear direction from the main body portion to each of the protrusions. A space that allows displacement of the protrusions is provided between the housing and the seal member. The housing is provided with a restriction portion
(Continued)

that is disposed between the plurality of the protrusions with a gap interposed therebetween.

2 Claims, 8 Drawing Sheets

(58) Field of Classification Search
USPC .......................................................... 439/519
See application file for complete search history.

(56) References Cited

U.S. PATENT DOCUMENTS

| | | | |
|---|---|---|---|
| 5,613,868 | A | 3/1997 | Ohsumi et al. |
| 5,618,206 | A | 4/1997 | Sawada et al. |
| 5,720,629 | A | 2/1998 | Self, Jr. et al. |
| 6,341,983 | B1 | 1/2002 | Crawford et al. |
| 9,577,369 | B2 | 2/2017 | Suzuki |
| 9,793,645 | B2 | 10/2017 | Yudate |
| 10,033,131 | B2 | 7/2018 | Uchiyama et al. |
| 2015/0129281 | A1 | 5/2015 | Hanaoka et al. |
| 2016/0197432 | A1 | 7/2016 | Suzuki |
| 2017/0179636 | A1 | 6/2017 | Yudate |
| 2017/0373429 | A1 * | 12/2017 | Uchiyama ............ H01R 13/521 |

FOREIGN PATENT DOCUMENTS

| | | | | |
|---|---|---|---|---|
| CN | 105633698 | | 6/2016 | |
| CN | 107528166 | | 12/2017 | |
| JP | 4-58975 | | 5/1992 | |
| JP | 7-320811 | | 12/1995 | |
| JP | 8-180928 | | 7/1996 | |
| JP | H08180928 | A * | 7/1996 | ......... H01R 13/5208 |
| JP | 2004-14168 | | 1/2004 | |
| JP | 2014-2978 | | 1/2014 | |
| JP | 2017-117571 | | 6/2017 | |
| JP | 2017-228408 | | 12/2017 | |

OTHER PUBLICATIONS

International Preliminary Report on Patentability issued in International Pat. Appl. No. PCT/JP2020/040551, dated Jun. 28, 2021 (with English translation).
China Office Action issued in CN Application No. 202080078581.4, dated Aug. 31, 2023.

* cited by examiner

CONNECTOR CAPABLE OF PREVENTING DAMAGE TO A SEAL MEMBER

TECHNICAL FIELD

The present disclosure relates to a connector.

BACKGROUND ART

A connector described in Patent Literature 1 includes a housing having a plurality of terminal accommodating chambers (hereinafter, referred to as cavities), a seal member having a plurality of seal holes, and a rear holder attached to the housing. The seal member is held between the rear holder and the housing. The housing accommodates a plurality of terminal fittings. The terminal fittings are inserted into the cavities from the rear holder side through the seal holes. Electric wires connected to the terminal fittings are liquid-tightly inserted into the seal holes of the seal member.

The seal member includes a main body portion and a plurality of following portions protruding forward from the main body portion. Each of the seal holes penetrates from the main body portion to each of the following portions. The main body portion has a tapered guide surface at the rear portion of the inner periphery of each of the seal holes. Each of the following portions is elastically deformable in a space formed between the housing and the seal member (in an accommodating recess that is open in the rear surface of the housing).

When the electric wire swings behind the rear holder, the following portion is elastically displaced in accordance with the swing of the electric wire. As a result, a state in which the electric wire is in close contact with inner surface of the seal hole of the following portion is maintained. Patent Literatures 2 and 3 each also disclose a connector including a rubber plug corresponding to a seal member. However, the connectors described in Patent Literatures 2 and 3 do not have a structure corresponding to the following portions.

CITATION LIST

Patent Literature

Patent Literature 1: JP 2017-228408 A

Patent Literature 2: JP H04-58975 U

Patent Literature 3: JP 2017-117571 A

SUMMARY OF INVENTION

Technical Problems

In assembling of a terminal fitting, there is a case where a large frictional resistance occurs between the terminal fitting and an upper portion of an inner surface of a seal hole in an upper stage, and an electric wire is inserted into the seal hole in the upper stage in a state where a following portion in the upper stage is deformed. Specifically, as illustrated in FIG. 8, there is a case where a following portion 3 in an upper stage is pushed by an electric wire and elastically deformed so as to be inclined upward. When the following portion 3 in the upper stage is inclined upward, a center in the vertical direction of a main body portion 4 is curved and deformed so as to protrude forward (in a direction of an arrow in FIG. 8), and a following portion 5 in a lower stage is also elastically deformed so as to be inclined downward. Thus, thereafter, when a terminal fitting enters a seal hole 6 in the lower stage, the terminal fitting may abut against a guide surface 7 standing at a steep angle (see reference sign A in FIG. 8), which may damage the seal member.

Thus, an object of the present disclosure is to provide a connector capable of preventing damage to a seal member while improving sealing property.

Solution to Problems

A connector according to the present disclosure includes: a housing having a plurality of cavities; a seal member having a plurality of seal holes; a rear holder that is locked to the housing and holds the seal member between the housing and the rear holder; and a terminal fitting that is inserted into a cavity of the plurality of cavities through a seal hole of the plurality of seal holes. The seal member includes a main body portion disposed on a side of the rear holder, and a plurality of protrusions protruding forward from the main body portion. Each of the plurality of seal holes has a shape penetrating in a front-rear direction from the main body portion to each of the plurality of protrusions, and an electric wire connected to the terminal fitting is inserted into the seal hole. A space that allows displacement of each of the plurality of protrusions is provided between the housing and the seal member. The housing is provided with a restriction portion disposed between the plurality of protrusions with a gap interposed therebetween.

Advantageous Effects of Invention

According to the present disclosure, it is possible to provide a connector capable of preventing damage to a seal member while improving sealing property.

DESCRIPTION OF EMBODIMENTS

Description of Embodiment of Present Disclosure

First, an embodiment of the present disclosure will be listed and described.

A connector according to the present disclosure includes: (1) a housing having a plurality of cavities; a seal member having a plurality of seal holes; a rear holder that is locked to the housing and holds the seal member between the housing and the rear holder; and a terminal fitting that is inserted into a cavity of the plurality of cavities through a seal hole of the plurality of seal holes. The seal member includes a main body portion disposed on a side of the rear holder, and a plurality of protrusions protruding forward from the main body portion. Each of the plurality of seal holes has a shape penetrating in a front-rear direction from the main body portion to each of the plurality of protrusions, and an electric wire connected to the terminal fitting is inserted into the seal hole. A space that allows displacement of each of the plurality of protrusions is provided between the housing and the seal member. The housing is provided with a restriction portion that is disposed between the plurality of protrusions with a gap interposed therebetween.

Figure 8:
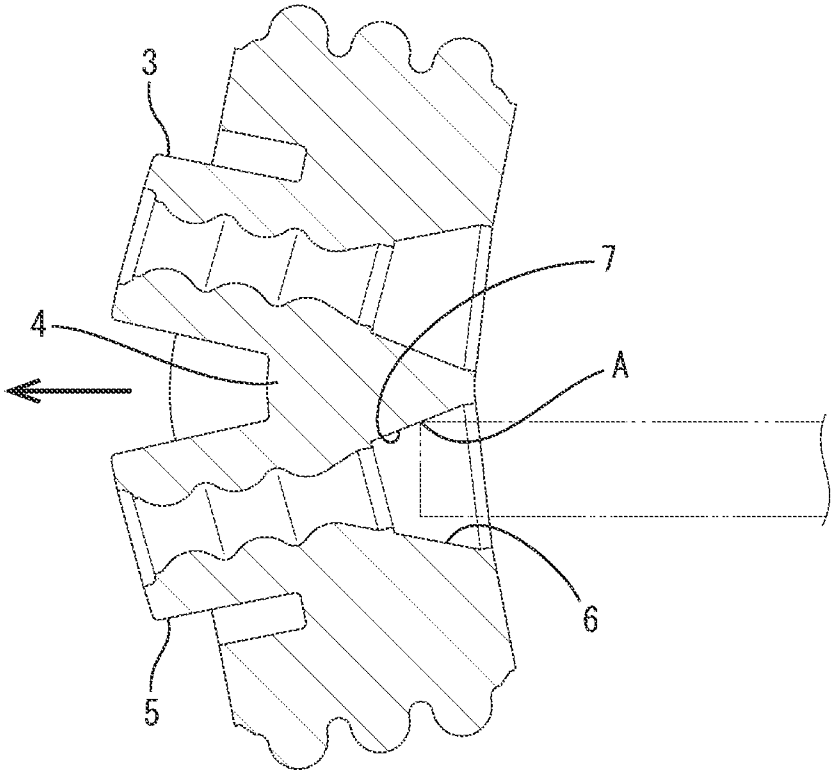
FIG. 8 is a side cross-sectional view of a curved and deformed seal member illustrating problems in the related art.

According to this configuration, since the restriction portion is disposed between the plurality of protrusions, a distal end of the restriction portion can be brought into contact with a front surface of the main body portion even if the seal member is elastically deformed. When the distal end of the restriction portion is brought into contact with the front surface of the main body portion, the main body portion can be prevented from being curved and deformed forward. Therefore, adjacent protrusions can be prevented from being elastically deformed so as to open forward (see FIG. 8) in a state where the terminal fitting is disposed in the seal hole of the protrusion. As a result, the seal member can be prevented from being damaged due to interference with the terminal fitting.

The protrusions are allowed to be displaced in the space between the housing and the seal member. Further, a gap is provided between the protrusions and the restriction portion, so that the protrusions are not in contact with the restriction portion. With this configuration, the protrusions can be displaced by following in accordance with swing of the electric wire. Thus, a state where the electric wire is in close contact with the inner surface of the seal hole can be maintained.

(2) The restriction portion, disposed between the plurality of protrusions, preferably has a gap from the front surface of the main body portion when the seal member is in a natural state. According to this configuration, when the seal member is in the natural state, since the restriction portion is not in contact with the front surface of the main body portion, the seal member is not pushed by the restriction portion and elastically deformed. Thus, the original sealing property of the seal member can be maintained.

(3) The plurality of protrusions may be arranged side by side in a width direction and in a height direction, and the restriction portion may be a plate piece that enters between the protrusions adjacent in the height direction and extends in the width direction so as to face the plurality of protrusions arranged in the width direction. According to the above configuration, as compared with a case where the restriction portion is divided in the width direction to be provided, a structure of the restriction portion can be made simpler, and strength of the restriction portion can be secured easily.

Details of Embodiment of Present Disclosure

Specific examples of the connector of the present disclosure will be described below with reference to the drawings. Note that the present invention is not limited to these examples, but is indicated by the claims, and is intended to include all modifications within the meaning and scope equivalent to the claims.

Figure 1:
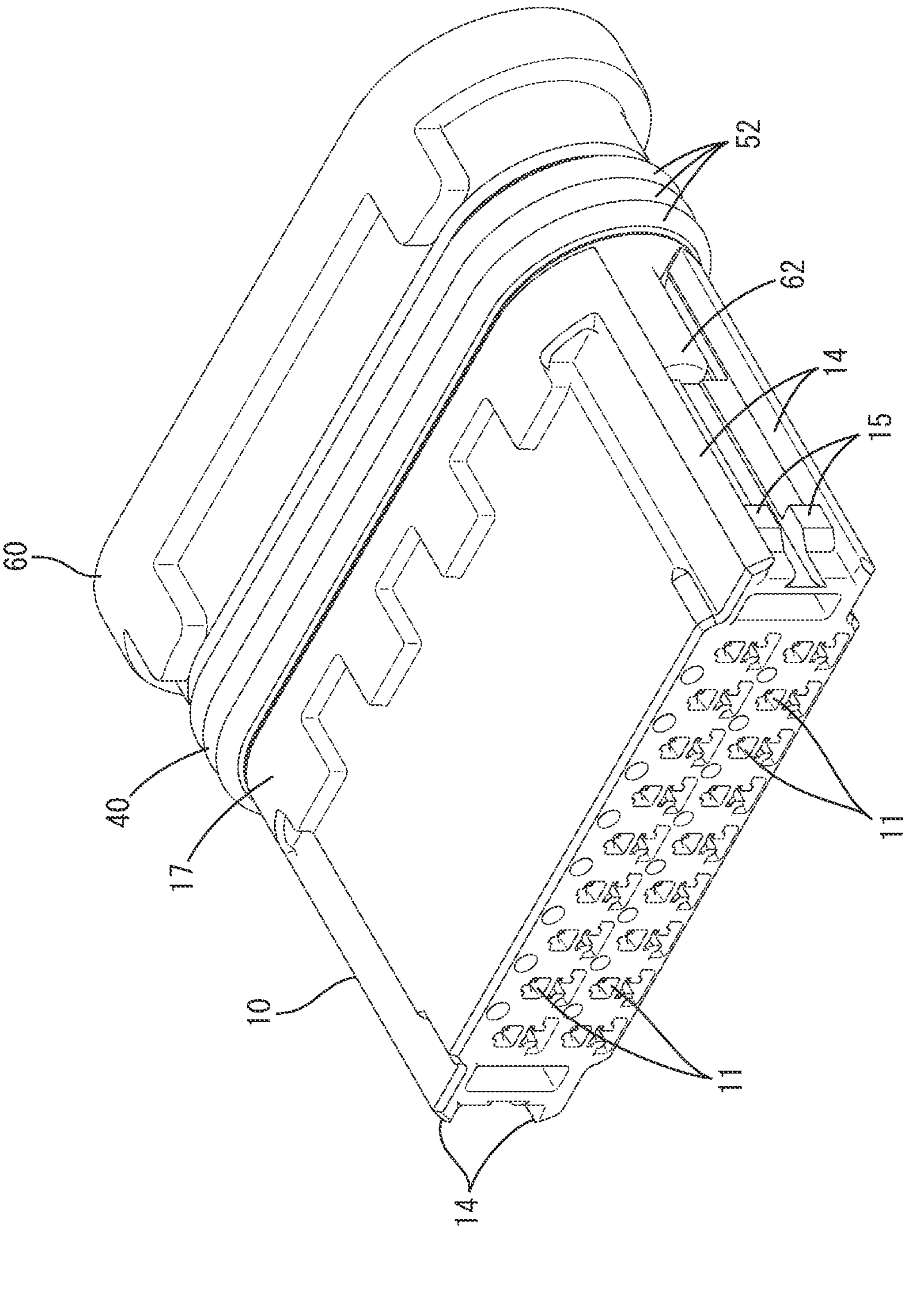
FIG. 1 is a perspective view of a connector as viewed obliquely from an upper front side in a present embodiment.
Figure 2:
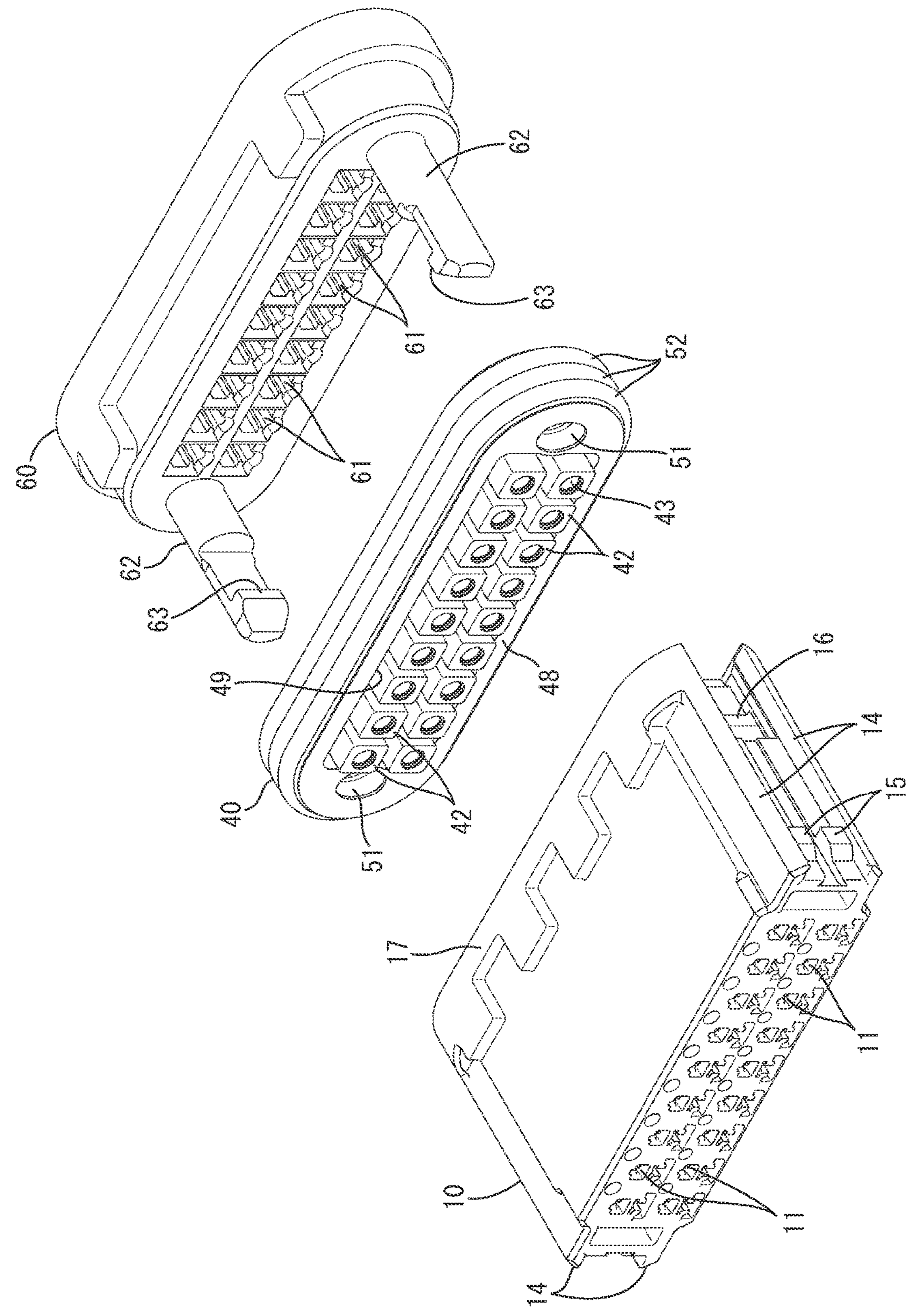
FIG. 2 is an exploded perspective view of the connector.
Figure 3:
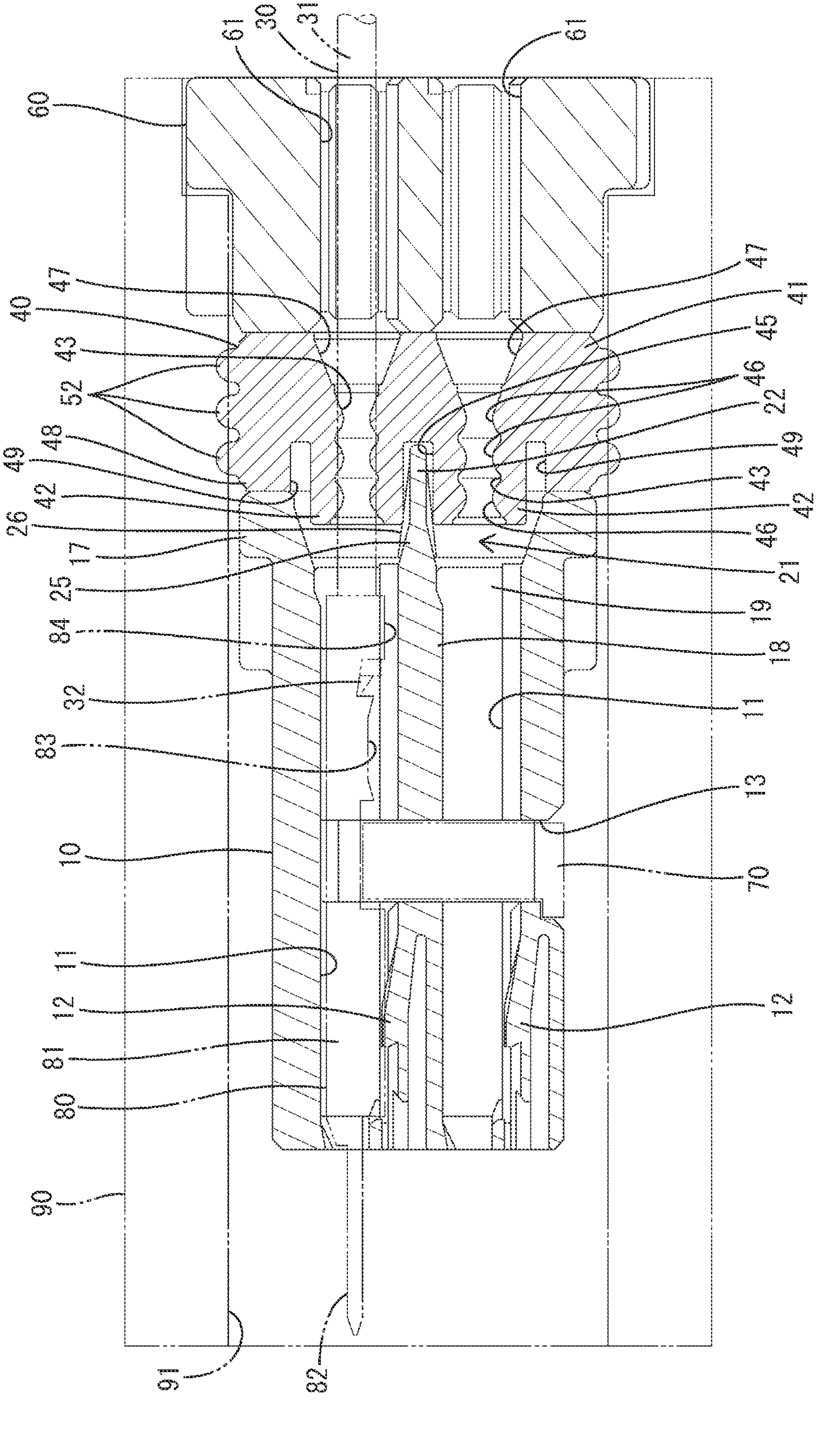
FIG. 3 is a side cross-sectional view of the connector.

As illustrated in FIG. 1 and FIG. 2, the connector of the present embodiment includes a housing 10, a seal member 40, and a rear holder 60. As illustrated in FIG. 3, a terminal fitting 80 is accommodated in the housing 10. The connector is assembled to a frame 90. The frame 90 is made of a synthetic resin and has a plurality of accommodating chambers 91 (only one chamber is illustrated in FIG. 3) although details are not illustrated. The connector is inserted into the accommodating chamber 91 of the frame 90. The connector is fitted to a mating connector (not illustrated) in a state where the connector is accommodated in the frame 90. In the following description, as for a front-rear direction, a surface side of the connector facing the mating connector at the start of fitting is referred to as a front side. A vertical direction is based on a vertical direction in each drawing except for FIG. 4.

<Housing 10>

Figure 5:
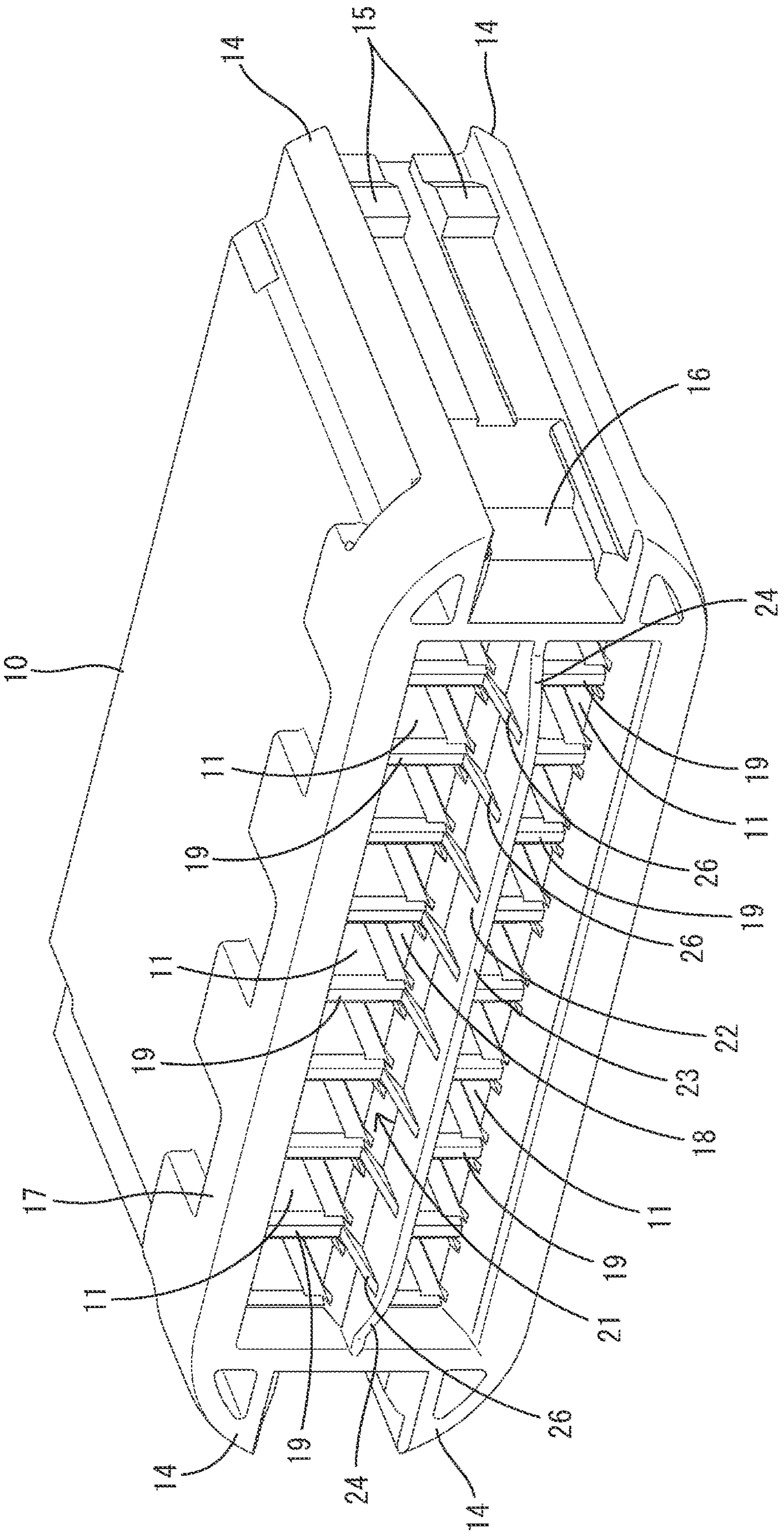
FIG. 5 is a perspective view of a housing as viewed obliquely from an upper rear side.

The housing 10 is made of a synthetic resin and has a flat shape in the width direction as illustrated in FIG. 2 and FIG. 5. The housing 10 has a plurality of cavities 11. The cavities 11 are arranged in the housing 10 in the height direction and in the width direction. The cavities 11 are arranged in two stages of an upper stage and a lower stage in the height direction.

As illustrated in FIG. 3, the housing 10 has a lance 12 protruding forward, on a lower surface of an inner wall of each cavity 11. The lance 12 is flexibly deformable in the vertical direction. The housing 10 has a retainer mounting hole 13 at an intermediate portion in the front-rear direction. The retainer mounting hole 13 communicates with each cavity 11 and opens in a lower surface of the housing 10. The terminal fitting 80 is inserted into each cavity 11 of the housing 10 from the rear side. The terminal fitting 80 is locked by the lance 12 in the cavity 11. The terminal fitting 80 is secondarily locked by a retainer 70 inserted into the retainer mounting hole 13. The terminal fitting 80 is retained in the cavity 11 by locking action of the lance 12 and the retainer 70.

Figure 4:
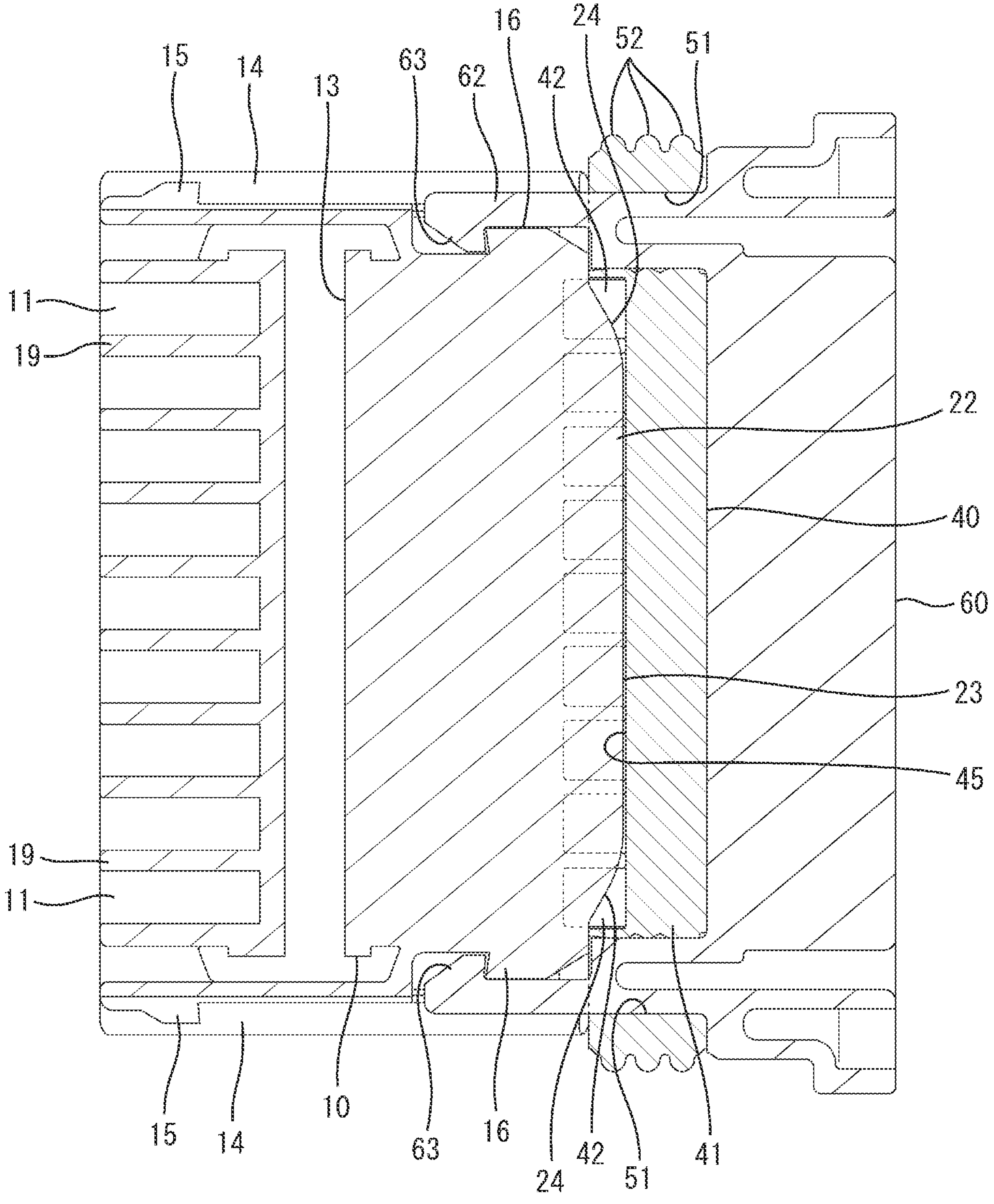
FIG. 4 is a plan cross-sectional view of the connector.

As illustrated in FIG. 2 and FIG. 5, the housing 10 has vertically paired guide ribs 14 provided on both side surfaces located at both widthwise ends of the housing 10, and has frame lock portions 15 and a holder lock portions 16 between the upper and lower guide ribs 14. As illustrated in FIG. 4, the frame lock portions 15 each have a claw shape and protrude at positions near the front end on both side surfaces of the housing 10. The frame lock portion 15 is locked to a frame lock receiving portion (not illustrated) provided in the accommodating chamber 91 of the frame 90. The connector is retained in the accommodating chamber 91 by locking action between the frame lock portions 15 and the frame lock receiving portions. The holder lock portions 16 each have a claw shape and protrude at positions near the rear end on both side surfaces of the housing 10.

As illustrated in FIG. 5, the housing 10 has a step provided near the rear end of the outer surface, and in the rear end portion, the housing 10 has an outer wall 17 which is thickened via the step.

As illustrated in FIG. 3, the housing 10 has a division wall 18 which partitions the cavities 11 arranged adjacently in the height direction. The division wall 18 is a lateral wall along the width direction and divides the inside of the housing 10 into upper and lower parts. Further, as illustrated in FIG. 5, the housing 10 has a partition wall 19 that partitions the cavities 11 arranged in the width direction. The partition wall 19 is a vertical wall along the vertical direction, and a plurality of partition walls 19 is provided in the width direction inside the housing 10.

The rear end of each partition wall 19 is disposed to be recessed forward from the rear end of the outer wall 17 of the housing 10. As illustrated in FIG. 3 and FIG. 5, the housing 10 has a space 21 inside the rear end portion, the rear end of each partition wall 19 facing the space 21. The space 21 is surrounded by the outer wall 17 of the housing 10.

The housing 10 has a restriction portion 22 protruding backward from the division wall 18. The restriction portion 22 is a plate piece elongated in the width direction and is provided continuously over the entire width of the division wall 18. In short, the restriction portion 22 has a shape crossing the space 21 of the housing 10 over the entire width. As illustrated in FIG. 3, a proximal end portion of the restriction portion 22 is disposed in the space 21 in the rear end portion of the housing 10. A distal end portion of the restriction portion 22 is disposed so as to protrude backward from the housing 10.

As illustrated in FIG. 4 and FIG. 5, a portion of the edge of the distal end portion of the restriction portion 22 excluding both end portions in the width direction is a straight portion 23 along the width direction. Both end portions in the width direction of the edge of the distal end portion of the restriction portion 22 are inclined portions 24 intersecting with the width direction. The inclined portions 24 are curved and continued to the straight portion 23.

As illustrated in FIG. 3, the proximal end portion of the restriction portion 22 has a root portion 25 whose thickness (vertical dimension) gradually decreases backward from the division wall 18. The upper and lower surfaces of the root portion 25 are inclined backward in a tapered shape. Upper and lower surfaces of the distal end portion of the restriction portion 22 are linearly formed backward from the root portion 25. As illustrated in FIG. 5, the restriction portion 22 has a plurality of ribs 26 extending from each partition wall 19 to the rear end (the straight portion 23). The root portion 25 is divided in the width direction by each rib 26. Each rib 26 has a role of reinforcing strength of the restriction portion 22.

<Seal Member 40>

Figure 6:
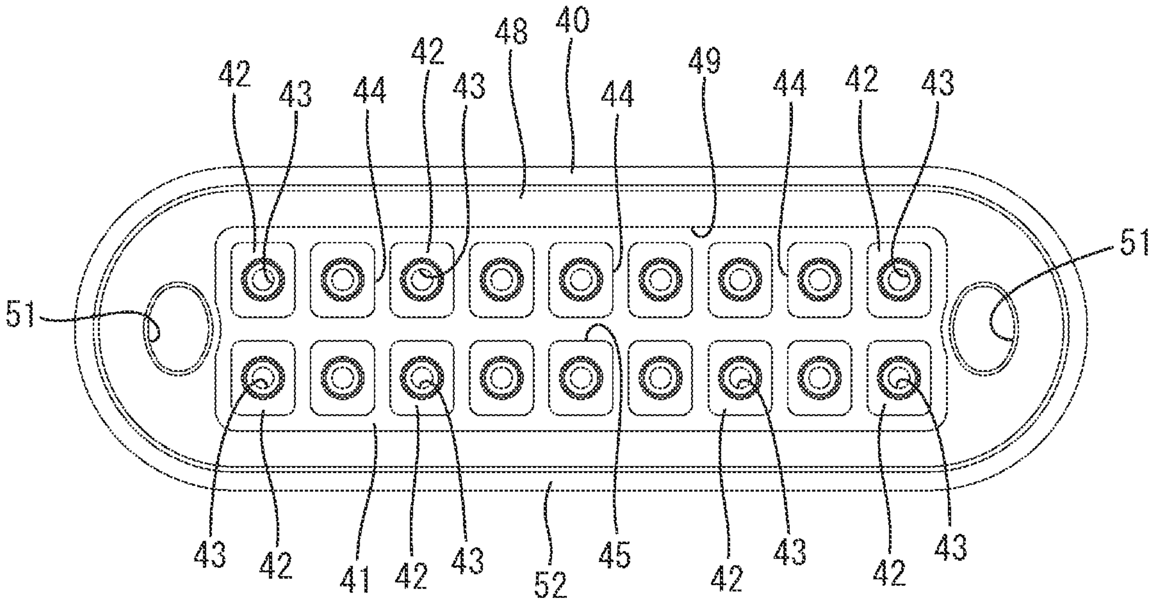
FIG. 6 is a front view of a seal member.

The seal member 40 is made of a rubber and has, at the rear portion, a main body portion 41 elongated in the width direction corresponding to the housing 10. As illustrated in FIG. 3 and FIG. 6, the seal member 40 has a plurality of protrusions 42 protruding forward from the main body portion 41. The protrusions 42 are provided side by side in the width direction and in the height direction at positions corresponding to the cavities 11. The seal member 40 has a plurality of seal holes 43 penetrating in the front-rear direction from the main body portion 41 to the protrusions 42. Each of the seal holes 43 has a circular cross-sectional shape. One seal hole 43 penetrates through one protrusion 42.

As illustrated in FIG. 6, each protrusion 42 has a rectangular outer shape in front view. The protrusions 42 arranged in the width direction are arranged adjacent to each other with vertical slits 44 along the vertical direction interposed therebetween. A plurality of the vertical slits 44 is formed with a constant groove width between the protrusions 42 adjacent in the width direction. The protrusions 42 aligned in the height direction (the protrusions 42 paired in the height direction) are arranged adjacent to each other via a lateral slit 45 extending along the width direction. The lateral slit 45 intersects with the vertical slits 44 at a right angle. One lateral slit 45 is formed in a central portion in the vertical direction of the seal member 40. As illustrated in FIG. 3, the restriction portion 22 enters the lateral slit 45. The slit width (opening width in the vertical direction) of the lateral slit 45 is larger than the thickness (vertical dimension) of the distal end portion of the restriction portion 22. Each of the vertical slits 44 and the lateral slits 45 is closed by the front surface of the main body portion 41.

As illustrated in FIG. 3, the seal member 40 has a plurality of inner peripheral lips 46 on the inner surface of each seal hole 43. The inner peripheral lips 46 are formed over the entire circumference on the inner surface of each seal hole 43. The inner peripheral lips 46 are arranged side by side in the front-rear direction on the inner surface of the seal hole 43. In the present embodiment, one inner peripheral lip 46 is provided at the front end portion of the main body portion 41, and two inner peripheral lips 46 are provided in the protrusions 42.

Figure 7:
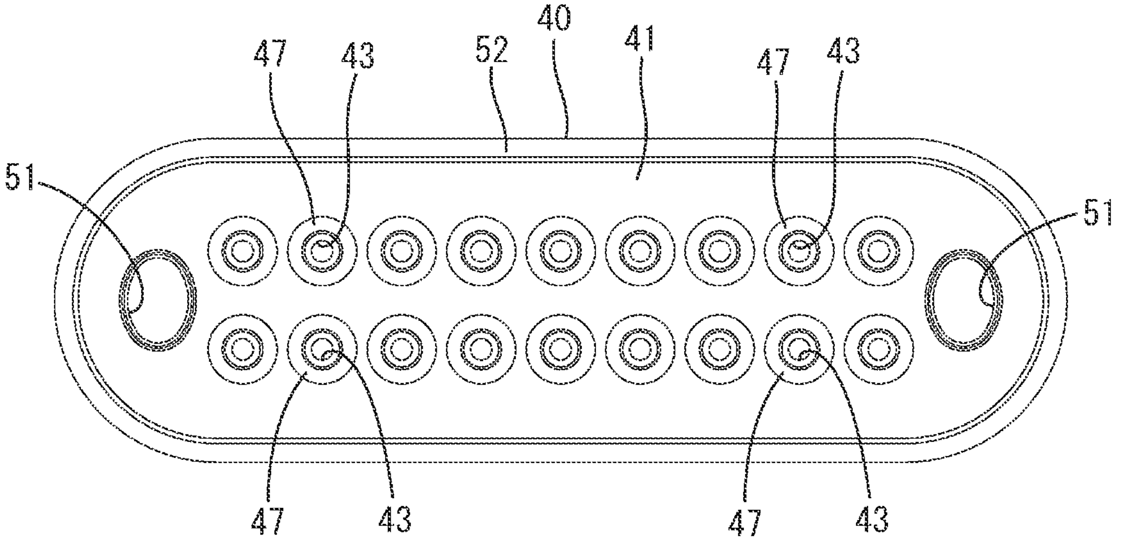
FIG. 7 is a rear view of the seal member.

As illustrated in FIG. 3 and FIG. 7, the main body portion 41 has, on the inner surface of each of the seal holes 43, a guiding surface 47 which expands in diameter from the rear end side of the inner peripheral lip 46 to the rear surface of the main body portion 41 (which is also the rear surface of the seal member 40). After the terminal fitting 80 passes through the seal hole 43 of the seal member 40, the electric wire 30 connected to the terminal fitting 80 is inserted into the seal hole 43. The guiding surface 47 guides entry of the terminal fitting 80 into the seal hole 43. The electric wire 30 inserted into the seal hole 43 comes into close contact with the inner peripheral lip 46. The electric wire 30 is liquid-tightly inserted into the seal hole 43 of the seal member 40.

As illustrated in FIG. 2 and FIG. 6, the seal member 40 has a peripheral portion 48 protruding forward from the main body portion 41 so as to surround the protrusions 42. The peripheral portion 48 has a peripheral groove 49 surrounding the protrusions 42 between the peripheral portion 48 and the protrusions 42. The peripheral groove 49 communicates with upper and lower ends of each of the vertical slits 44 and both widthwise ends of the lateral slit 45. The peripheral groove 49 is closed by the front surface of the main body portion 41. The front surface of the peripheral portion 48 is disposed to be recessed backward from the front surface of each protrusion 42. The front surface of the peripheral portion 48 and the front surface of each protrusion 42 are each an end surface along the vertical direction.

The peripheral portion 48 has a pair of through holes 51 penetrating in the front-rear direction at both ends in the width direction. The through hole 51 has a circular cross-sectional shape, specifically, a circular cross-sectional shape elongated in the vertical direction.

As illustrated in FIG. 1 to FIG. 4, the seal member 40 has a plurality of outer peripheral lips 52 on the outer periphery. The outer peripheral lips 52 are formed over the entire outer periphery of the seal member 40. The outer peripheral lips 52 are arranged side by side in the front-rear direction on the outer periphery of the seal member 40. In the present embodiment, two outer peripheral lips 52 are provided in the main body portion 41 and one outer peripheral lip 52 is provided in the peripheral portion 48. Each outer peripheral lip 52 comes into close contact with the inner surface of the accommodating chamber 91 of the frame 90. The connector is liquid-tightly accommodated in the accommodating chamber 91 of the frame 90 via the seal member 40.

<Rear Holder 60>

The rear holder 60 is made of a synthetic resin and has a shape elongated in the width direction corresponding to the housing 10 and the seal member 40, as illustrated in FIG. 2. The rear holder 60 has a plurality of insertion holes 61 at positions corresponding to the respective seal holes 43. Each insertion hole 61 has a rectangular cross-sectional shape. As illustrated in FIG. 3, the electric wire 30 is inserted into each insertion hole 61 of the rear holder 60 with play.

As illustrated in FIG. 2, the rear holder 60 has a pair of protrusions 62 protruding forward at both ends in the width direction. As illustrated in FIG. 4, the proximal end portion of each of the protrusions 62 is disposed so as to pass through each of the through holes 51 of the seal member 40. Each of the protrusions 62 has a lock projection 63 on the inner side (the side facing each other) of the distal end portion (front end portion).

<Terminal Fitting 80>

The terminal fitting 80 is formed by bending a conductive metal plate. As illustrated in FIG. 3, the terminal fitting 80 includes a tubular terminal body 81, a tab portion 82 protruding forward from the terminal body 81, and a wire barrel portion 83 and an insulation barrel portion 84 continuing rearward from the terminal body 81. The wire barrel portion 83 is connected to a core wire portion 32 exposed by removal of a sheath 31 at the end portion of the electric wire 30 (sheathed electric wire) by crimping. The insulation barrel portion 84 is disposed behind the wire barrel portion 83. The insulation barrel portion 84 is connected to the sheath 31 of the electric wire 30 by crimping.

The terminal body 81 is locked to the lance 12 in the cavity 11. The tab portion 82 is inserted into a box portion of a mating terminal fitting (not illustrated). When the tab portion 82 comes into contact with a contact portion in the box portion, the terminal fitting 80 is electrically connected to the mating terminal fitting.

<Entire Structure of Connector>

In assembling, as illustrated in FIG. 4, each lock protrusion 63 of the rear holder 60 is locked to each holder lock portion 16 of the housing 10 in a state where the seal member 40 is placed between the rear holder 60 and the housing 10. As a result, the rear holder 60 is held to the housing 10, and the seal member 40 is held between the rear holder 60 and the housing 10. The peripheral portion 48 of the seal member 40 is compressed between the rear holder 60 and the housing 10. The protrusions 62 pass through the through holes 51, so that the seal member 40 is disposed in such a state as positioned to the housing 10 and the rear holder 60.

In a state where the seal member 40 is assembled to the housing 10, as illustrated in FIG. 3, the restriction portion 22 of the housing 10 enters the lateral slit 45 formed between the protrusions 42 adjacent in the height direction. In a case where the seal member 40 is not elastically deformed and each protrusion 42 is not displaced in the vertical direction, a gap is provided in the height direction between the restriction portion 22 and each protrusion 42. Further, a gap in the front-rear direction is provided between the restriction portion 22 and the front surface of the main body portion 41.

A front surface of each protrusion 42 faces a space 21 formed between the housing 10 and the rear holder 60 and is not in contact with each partition wall 19 of the housing 10, or the like. The side surface of each protrusion 42 faces the lateral slit 45, the peripheral groove 49, the vertical slit 44, and the gap formed between the protrusion 42 and the restriction portion 22, and is not in contact with the peripheral portion 48 and the restriction portion 22. Thus, each protrusion 42 is disposed in a state where elastic displacement is allowed in the space 21.

The terminal fitting 80 is inserted into the cavity 11 of the housing 10 from the rear side. The tab portion 82 of the terminal fitting 80 passes through the insertion hole 61 and the seal hole 43 in this order, enters the cavity 11, and is disposed so as to protrude from the cavity 11 to the front side of the housing 10. The terminal body 81 of the terminal fitting 80 is inserted into the cavity 11. The terminal body 81 is locked to the lance 12 and is retained in the cavity 11. In a state where the terminal body 81 is retained in the cavity 11, the electric wire 30 connected to the terminal fitting 80 is drawn backward from the rear holder 60. In a state where the connector is accommodated in the accommodating chamber 91 of the frame 90, the tab portion 82 is disposed so as to protrude into the accommodating chamber 91. The tab portion 82 is connected to a mating terminal fitting (not illustrated) in the accommodating chamber 91.

After the terminal fitting 80 is assembled, when the electric wire 30 swings in a direction intersecting with the front-rear direction (drawing direction) behind the rear holder 60, the vibration force is transmitted to the seal member 40. In a case of the present embodiment, the protrusion 42 can be elastically displaced in accordance with the swing of the electric wire 30 with a connecting portion with the main body portion 41 serving as a fulcrum. As described above, since the protrusion 42 follows the swing of the electric wire 30, an opening is prevented from occurring between the protrusion 42 and the electric wire 30 in the seal hole 43. Thus, the state where the electric wire 30 is in close contact with the inner surface of the seal hole 43 of the protrusion 42 can be maintained.

By the way, for example, when the tab portion 82 of the terminal fitting 80 passes through the seal hole 43 of the protrusion 42 in the upper stage, a distal end of the tab portion 82 slides on an upper portion of the guiding surface 47 of the seal hole 43, so that a force that causes the protrusion 42 to be inclined upward may be applied to the protrusion 42 in the upper stage. If the protrusion 42 in the upper stage is deformed so as to be inclined upward by receiving the force, there is a concern that the central portion in the vertical direction of the main body portion 41 is curved so as to protrude forward, and the protrusion 42 in the lower stage is also deformed so as to be inclined downward together with elastic deformation (curved deformation) of the main body portion 41 (see FIG. 8, although reference numerals are different).

In a case of the present embodiment, however, when the main body portion 41 is going to be curved forward, the central portion in the vertical direction of the main body portion 41 comes into contact with the distal end (the straight portion 23) of the restriction portion 22, so that elastic deformation of the main body portion 41 toward the front side can be prevented. As a result, the protrusion 42 in the lower stage is prevented from being deformed downward, and the protrusion 42 in the upper stage is also prevented from being deformed upward.

As a result of the restriction portion 22 preventing elastic deformation of the main body portion 41, even when the electric wire 30 has been inserted into the protrusion 42 in the upper stage, a state where the protrusions 42 in the upper and lower stages protrude straight backward from the main body portion 41 can be maintained. Thus, thereafter, when the tab portion 82 of the terminal fitting 80 passes through the seal hole 43 of the protrusion 42 in the lower stage, the tab portion 82 does not strongly interfere with the inner surface of the seal hole 43. Thus, the seal member 40 can be prevented from being damaged due to interference with the tab portion 82.

As described above, according to the present embodiment, the restriction portion 22 enters the lateral slit 45 formed between the protrusions 42, and the distal end of the restriction portion 22 is brought into contact with the front surface of the main body portion 41, so that the main body portion 41 can be prevented from being curved and deformed forward. Thus, a state where the protrusions 42 protrude along the front-rear direction can be maintained, and consequently, a state where the electric wire 30 is properly inserted into the seal hole 43 of the protrusion 42 can be realized.

In addition, each protrusion 42 is allowed to be elastically displaced in the space 21 provided between the housing 10 and the seal member 40. Further, a gap is provided between the protrusion 42 and the restriction portion 22, so that the protrusion 42 is not in contact with the restriction portion 22. With this configuration, each protrusion 42 can be elastically displaced by following in accordance with swing of the electric wire 30. Thus, a state where the electric wire 30 is properly inserted into the seal hole 43 of the protrusion 42 can be more reliably realized.

When the seal member 40 is in a natural state (a state where the seal member 40 is not elastically deformed), the restriction portion 22 that has entered the lateral slit 45 has a gap from the front surface of the main body portion 41. Thus, since the seal member 40 in the natural state is not pushed by the restriction portion 22 and elastically deformed, the original sealing property of the seal member 40 can be maintained.

The restriction portion 22 is configured as a plate piece that enters the lateral slit 45 formed between the protrusions 42 adjacent in the height direction and extends in the width direction so as to face the protrusions 42 arranged in the width direction. Thus, as compared with a case where the restriction portion 22 is divided into a plurality of portions in the width direction to be provided, a structure of the restriction portion 22 can be made simpler, and strength of the restriction portion 22 can be secured easily.

Other Embodiments of Present Disclosure

It should be considered that the embodiment disclosed herein is an example in all respects and is not restrictive.

In the above embodiment, the restriction portion has a shape along the width direction so as to enter between the protrusions adjacent in the height direction. However, as another embodiment, the restriction portion may have a shape along the height direction so as to enter between the protrusions adjacent in the width direction.

In the above embodiment, the restriction portion is a plate piece. However, as another embodiment, the restriction portion is not particularly limited as long as the restriction portion has a shape capable of preventing elastic deformation of the main body portion toward the front side. For example, the restriction portion may have a shape such as a cylinder, a prism, a triangle in cross section, or a cross shape in cross section.

In the above embodiment, the restriction portion has such a shape that crosses the space of the housing over the entire width so as to face all of the protrusions arranged in the width direction. However, as another embodiment, the restriction portion may be divided into a plurality of portions in the width direction. In this case, the restriction portions may be provided so as to individually face the respective protrusions arranged in the width direction or may be provided to face a plurality of sets of the protrusions arranged in the width direction. Further, the restriction portions may be provided at positions shifted from the respective protrusions arranged in the width direction.

In the above embodiment, the terminal fitting is a male terminal fitting in which the tab portion protrudes forward. However, as another embodiment, the terminal fitting may be a female terminal fitting which includes a box portion having a contact portion provided therein.

REFERENCE SIGNS LIST

3 following portion in upper stage (background art)
4 main body portion (background art)
5 following portion in lower stage (background art)
6 seal hole in lower stage (background art)
7 guide surface (background art)
10 housing
11 cavity
12 lance
13 retainer mounting hole
14 guide rib
15 frame lock portion
16 holder lock portion
17 outer wall
18 division wall
19 partition wall
21 space
22 restriction portion
23 straight portion
24 inclined portion
25 root portion
26 rib
30 electric wire
31 sheath
32 core wire portion
40 seal member
41 main body portion
42 protrusion
43 seal hole
44 vertical slit
45 lateral slit
46 inner peripheral lip
47 guiding surface
48 peripheral portion
49 peripheral groove
51 through-hole
52 outer peripheral lip
60 rear holder
61 insertion hole
62 protrusion
63 lock projection
70 retainer
80 terminal fitting
81 terminal body
82 tab portion
83 wire barrel portion
84 insulation barrel portion
90 frame
91 accommodating chamber

The invention claimed is:

1. A connector comprising:

a housing having a plurality of cavities;

a seal member having a plurality of seal holes;

a rear holder that is locked to the housing and holds the seal member between the housing and the rear holder; and a terminal fitting that is inserted into a cavity of the plurality of cavities through a seal hole of the plurality of seal holes, wherein the seal member includes a main body portion disposed on a side of the rear holder, and a plurality of protrusions protruding forward from the main body portion, each of the plurality of seal holes has a shape penetrating in a front-rear direction from the main body portion to each of the plurality of protrusions, and an electric wire connected to the terminal fitting is inserted into the seal hole, a space that allows displacement of each of the plurality of protrusions is provided between the housing and the seal member, the housing is provided with a restriction portion that is disposed between the plurality of protrusions with a gap interposed therebetween, and in a state where the seal member is not elastically deformed, the restriction portion is disposed not in contact with a front surface of the main body portion and also not in contact with side surfaces of the plurality of protrusions.

2. The connector according to claim 1, wherein the plurality of protrusions is arranged side by side in a width direction and in a height direction, and the restriction portion is a plate piece that enters between the plurality of protrusions adjacent in the height direction and extends in the width direction so as to face the plurality of protrusions arranged in the width direction.

* * * * *